(12) United States Patent
Dohm

(10) Patent No.: US 6,908,276 B2
(45) Date of Patent: Jun. 21, 2005

(54) INTERNALLY THREADED FASTENER AND STEMMED WASHER ASSEMBLY

(75) Inventor: Stephen R. Dohm, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 77 days.

(21) Appl. No.: 10/050,243

(22) Filed: Jan. 16, 2002

(65) Prior Publication Data
US 2003/0133771 A1 Jul. 17, 2003

(51) Int. Cl.[7] ............................................. F16B 43/00
(52) U.S. Cl. .................... 411/533; 411/544; 411/546; 411/156; 411/999
(58) Field of Search ......................... 411/180, 533, 411/545, 546, 155, 156, 352, 353, 999, 544

(56) References Cited

U.S. PATENT DOCUMENTS

| | | | |
|---|---|---|---|
| 2,779,375 A | | 1/1957 | O'Connor |
| 3,218,906 A | | 11/1965 | Dupree |
| 3,765,078 A | | 10/1973 | Gulistan |
| 4,193,434 A | * | 3/1980 | Wagner |
| 4,435,112 A | * | 3/1984 | Becker |
| 4,587,377 A | * | 5/1986 | Rodseth |
| 4,900,209 A | | 2/1990 | Reynolds |
| 4,969,788 A | * | 11/1990 | Goiny |
| 4,971,498 A | | 11/1990 | Goforthe |
| 5,020,951 A | | 6/1991 | Smith |
| 5,380,136 A | | 1/1995 | Copple et al. |
| 5,468,104 A | | 11/1995 | Reid et al. |
| 5,528,812 A | | 6/1996 | Müller |
| 5,584,628 A | * | 12/1996 | Bernoni |
| 5,662,444 A | * | 9/1997 | Schmidt |
| 5,688,091 A | | 11/1997 | McKinlay |
| 5,807,052 A | * | 9/1998 | Van Boven |
| 5,934,851 A | | 8/1999 | Stewart et al. |
| 6,030,161 A | * | 2/2000 | Udell |
| 6,102,610 A | * | 8/2000 | Palusis |
| 2002/0182031 A1 | * | 12/2002 | Anderson et al. ........... 411/533 |

FOREIGN PATENT DOCUMENTS

| | | |
|---|---|---|
| EP | 0 004 185 A1 | 9/1979 |
| GB | 2 109 079 A | 5/1983 |

* cited by examiner

Primary Examiner—Flemming Saether
(74) Attorney, Agent, or Firm—Fletcher Yoder

(57) ABSTRACT

An assembly of an internally threaded fastener and a stemmed washer is provided, such as for applications in which a standoff is desired between a washer and a mating externally threaded fastener. The stemmed washer includes a washer portion, a retaining portion and a standoff portion. The washer portion is angled relative to the standoff portion. The angle of the washer portion to the standoff portion may be varied to change the effective length of the standoff portion. The retaining portion interfaces with the internally threaded fastener to retain the fastener in the assembly. The stemmed washer may include a skirt that is plastically deformed to capture the fastener. The fastener may include a skirt which similarly plastically to mate with a retaining lip on the stemmed washer. The fastener and washer may be secured in the assembly to permit relative rotation of the fastener with respect to the washer.

30 Claims, 3 Drawing Sheets

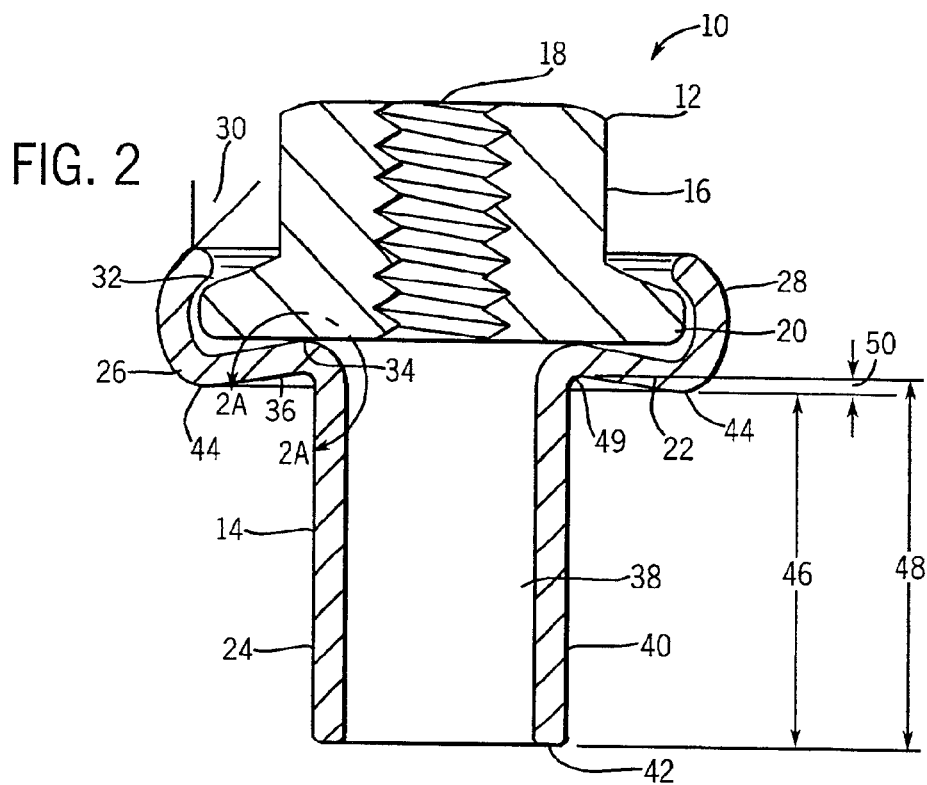
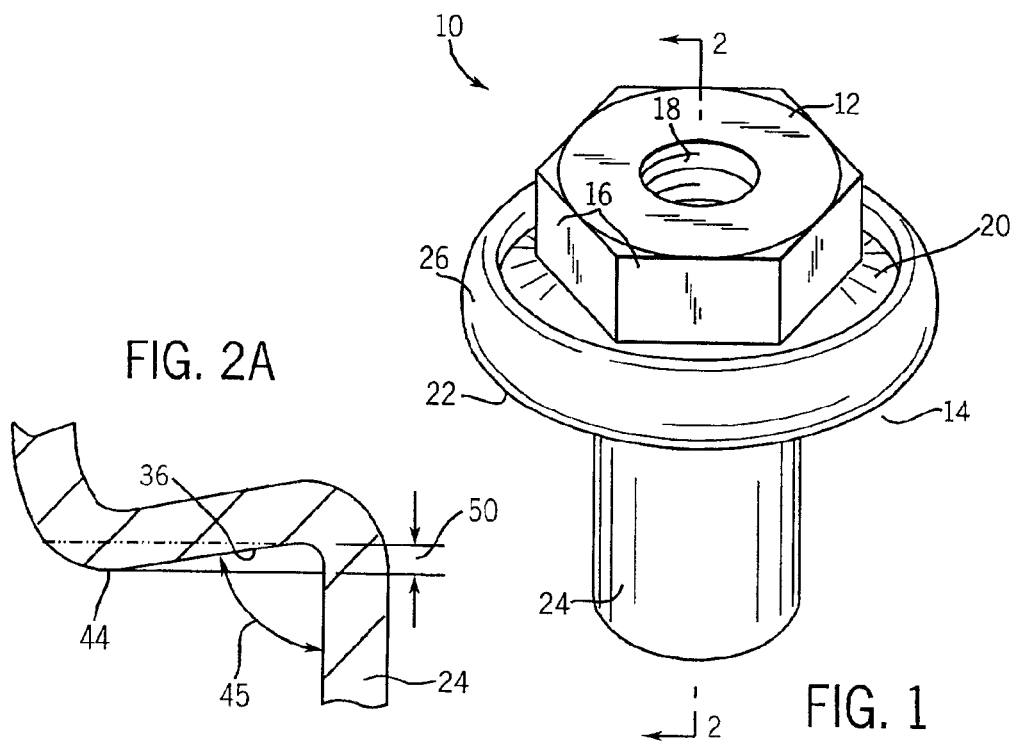

INTERNALLY THREADED FASTENER AND STEMMED WASHER ASSEMBLY

BACKGROUND OF THE INVENTION

The present invention relates generally to the field of threaded fasteners, and more particularly to an internally threaded fastener, such as a threaded nut, joined in an assembly with a stemmed washer. The invention also relates to a manner for enabling the effective length of the stemmed washer to vary. The invention also relates to a manner for retaining an internally threaded fastener and such an assembly, and to a method for making the assembly.

A variety of applications are known for threaded fasteners used with standoffs. In a number of applications wherein one or more compressible materials are to be secured, for example, a standoff is commonly inserted into an aperture in the compressible material, and threaded or other fasteners are placed through the standoff for securing the compressible material in a desired position. Compressible materials on which standoffs are commonly used include various plastics, rubbers, foam materials, and so forth, but may also include expanded metals, cellulosic products, and so forth. Moreover, standoffs are also commonly used in applications wherein penetration of one or more fasteners is to be limited, although the material being fastened in place is not necessarily particularly compressible, such as in fragile or brittle materials.

Where applications call for the use of mechanical standoffs, prior art arrangements have typically relied upon separate components which are brought together in place to permit securing without crushing compressible materials, or while maintaining a desired distance between mechanical components, typically a screw or bolt and a nut. Thus, in a traditional assembly, a standoff is placed in the receiving aperture, a screw or bolt is passed through the aperture and standoff, and a traditional washer and nut are secured on the opposite side. While such arrangements provide generally adequate resistance to crushing and maintain desired mechanical distances between the joined fasteners, they require several separate parts and can entail considerable assembly time for insertion of the standoff, and assembly of the fasteners. Moreover, the various separate parts must be individually manufactured, shipped, stored and brought together in the final assembly. In addition, the thickness of the materials may vary for a number of reasons, such as variation produced during manufacture.

There is a need, therefore, for an improved arrangement for securing fasteners to one another in applications requiring standoffs. There is a particular need for a technique that would facilitate assembly, while providing a high degree of resistance to crushing, and which would maintain desired distance between elements of the threaded assembly, even with variations in the dimensions of the materials and fasteners.

SUMMARY OF THE INVENTION

The present technique provides an assembly of an internally threaded fastener with a stemmed washer designed to respond to such needs. The washer may include a generally conical section that is designed to fit against an element being fastened in a manner of a conventional washer, and a standoff section extending from the conical section. The standoff and washer are hollow, thereby permitting a fastener, such as a screw or bolt, to be inserted therethrough. The washer can be dimensioned such that sufficient distribution of load is maintained to avoid damage to the elements being fastened. The standoff can be made any suitable length, and may be tailored to specific applications, depending upon the desired thickness or final dimensions of the elements being fastened.

The threaded fastener assembled with the stemmed washer may be any suitable type, such as a flanged nut. In the latter case, the nut presents a flange around a lower peripheral edge that can be captured in a section of the washer; In one embodiment, an upstanding skirt on the washer is bent inwardly to capture a flange on a nut to maintain the nut in the assembly, while allowing the nut to rotate freely with respect to the washer. The entire assembly may be manufactured in a straightforward and cost-effective manner. In one exemplary method, for example, the washer and standoff element is made by a stamping process, with an open skirt extending upwardly from the washer portion. A flanged nut is then placed over the washer and the skirt is crimped or otherwise deformed to close the skirt slightly around the flange of the nut to complete the assembly and retain the nut in place, while allowing its free rotation.

BRIEF DESCRIPTION OF THE DRAWINGS

The foregoing and other advantages of the invention will become apparent upon reading the following detailed description and upon reference to the drawings in which:

FIG. 1 is a perspective view of a fastener and stemmed washer assembly in accordance with certain aspects of the present technique;

FIG. 2 is a sectional view through the assembly of FIG. 1 illustrating an exemplary configuration of the internally threaded fastener and stemmed washer;

FIG. 2A is a detailed view of a portion of the stemmed washer, taken generally along line 2A—2A of FIG. 3;

DETAILED DESCRIPTION OF SPECIFIC EMBODIMENTS

Figure 3:
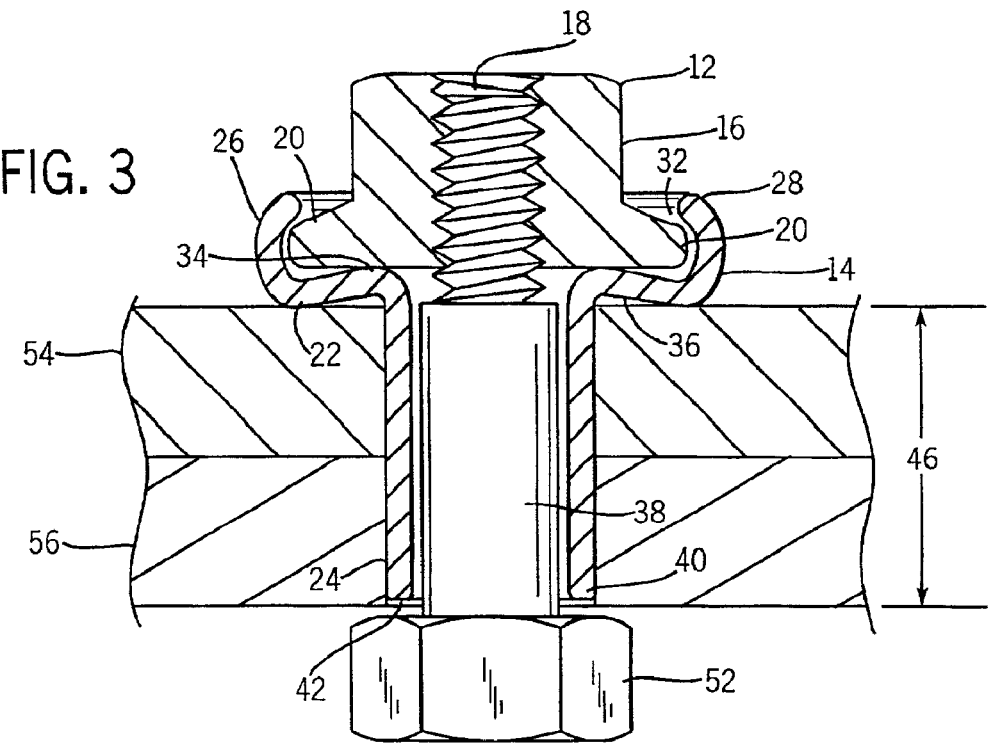
FIGS. 3 and 4 are sectional views of the assembly illustrated in FIGS. 1 and 2, illustrating installation with a mating fastener to maintain elements in a desired location within a final assembly.

Turning now to the drawings and referring first to FIG. 1, an assembly is illustrated in accordance with the present technique and designated generally by reference numeral 10. The assembly includes an internally threaded fastener 12 secured to a stemmed washer 14. In the illustrated embodiment the fastener 12 is a hex nut having hex flats 16 for interfacing with a conventional wrench. Internal threads 18 are provided for interfacing with a mating threaded fastener as described in greater detail below. A peripheral flange 20 is formed around a base of fastener 12 to interface with a corresponding portion of the stemmed washer to maintain the fastener in the assembly and to permit free spinning of the fastener for securement in an application.

The stemmed washer 14 includes features which serve both as a conventional washer, as a standoff, and as a retaining structure for the fastener 12. In the illustrated embodiment, the stemmed washer 14 thus includes a generally conical washer portion 22 integrally formed with a standoff portion 24. The generally conical washer portion 22 serves as a spring washer. Standoff portion 24 is generally right cylindrical in shape in the illustrated embodiment, although other overall shapes (e.g., tapered) may be employed. Moreover, the shape and contour of the washer portion 22 may be adapted for various purposes, and may deviate from the conical shape illustrated. The retaining portion 26 extends upwardly from the washer portion 22 and extends inwardly slightly over the flange 20 of the fastener to retain the fastener within the assembly. In a present embodiment, the retaining portion 26 fits loosely around the flange 20 to permit free spinning movement of the fastener within the assembly.

Referring to FIG. 2, the assembly of FIG. 1 is illustrated in cross-section. As noted above, the assembly 10 includes a fastener 12 and a stemmed washer 14. The stemmed washer includes a washer portion 22, a standoff portion 24, and a retaining portion 26. In the illustrated embodiment, the retaining portion 26 generally forms an upstanding skirt 28 bent inwardly towards the fastener 12 so as to retain the fastener by interference with the flange 20 provided at the lower extremity of the fastener. While the upstanding skirt 28 may have any suitable shape and contour, in the illustrated embodiment the skirt is angled inwardly slightly through an angle 30 to form a cavity 32 in which the fastener is retained. The fastener thus rests upon an inner surface 34 of the retaining portion 26 and exerts force against the inner surface 34 when drawn into engagement with a mating fastener. The washer portion 22 presents an outer surface 36 at its lower face opposite the inner surface 34 for contacting an element to be secured in place. The washer portion 22 is comprised of an elastically deformable material, such as a plastic or soft metal. The standoff portion 24 has an aperture 38 extending therethrough for receiving a mating fastener as described below. Aperture 38 is surrounded by side walls 40, which is noted above, may be straight cylindrical in shape as illustrated, or may be contoured, flared, or otherwise bent or ridged. Various lengths of the standoff portion 24 may be provided. An abutment end 42 of the standoff portion 24 serves to contact a mating surface, such as of a mating fastener as described below.

Referring generally to FIGS. 2 and 2A, the outer surface 36 of the washer portion 22 has an area of abutment 44 with a mating fastener. The distance from the area of abutment 44 to the abutment end 42 defines the effective height of the standoff portion 24. The effective height of the standoff portion 24 of the illustrated embodiment is variable due to the conical shape of the generally conical washer portion 22 and the ability of the washer portion 22 to be elastically deformed. The washer portion 22 extends from the standoff portion 24 so that there is an angle 45 between the area of abutment 44 and the standoff portion 24. The washer portion 22 is adapted so that the angle 45 is biased to an acute angle. The distance 46 from the area of abutment 44 to the abutment end 42 when the washer portion 22 is un-deformed defines the minimum effective height of the standoff portion 24.

A force exerted by the fastener 12 against the inner surface 34 will tend to elastically deform and flatten the generally conical washer portion 22 against the mating fastener or materials captured therebetween. As the generally conical washer portion 22 flattens, the angle 45 between the area of abutment 44 and the standoff portion 24 increases. The distance 48 between the area of abutment 44 and the plane of the abutment end 42 when the washer portion 22 is approximately transverse to the top 49 of the standoff portion 24, as represented by the dashed line in FIG. 2A, defines a maximum effective height of the standoff portion 24. The difference 50 between the maximum effective height and the minimum effective height thereby provides a range of variability in the effective height of the standoff portion 24. The difference 50 is a function of angle 45 and the length of the washer portion 22 from the top 49 to the area of abutment 44. The length of the washer portion 22 from the top 49 to the area of abutment 44 generally defines the hypotenuse of a right triangle formed by the standoff portion and the washer portion. The difference 50 is the adjacent side of the right triangle to angle 45. Multiplying the cosine of angle 45 by the length of the hypotenuse provides the length of the adjacent side, i.e., the difference 50 between the maximum effective height and the minimum effective height. Varying either angle 45 or the length of the washer portion 22 will vary the difference 50 between the maximum effective height and the minimum effective height.

Figure 4:
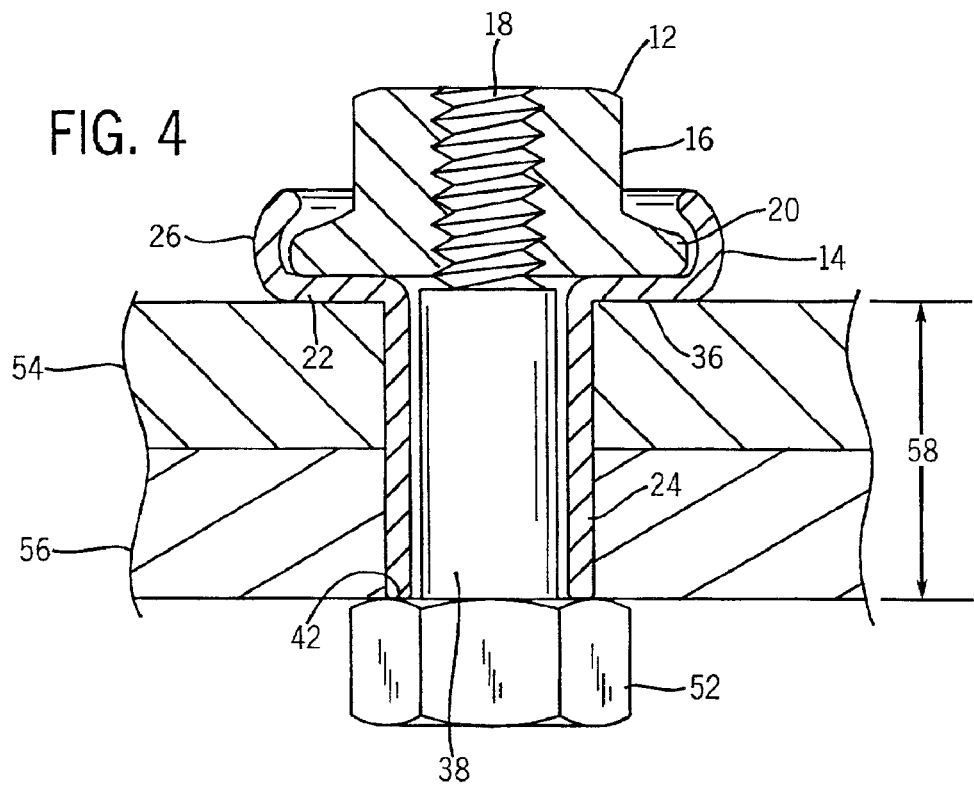

The assembly of FIGS. 1 and 2 is illustrated in an application in FIGS. 3 and 4. As shown in FIGS. 3 and 4, the assembly 10 is designed to cooperate with a mating fastener 52, such as a screw or bolt, which is received within the internally threaded fastener 12 of the assembly. In practice, the assembly 10 may be simply inserted into apertures formed within elements to be secured to one another, such as element 54 and element 56 in the illustrated embodiment of FIG. 3, and the mating fastener 52 inserted from an opposite side. The mating fastener 52, and/or the fastener 12 may then be rotated to join the assembly 10 to the mating fastener 52, with the elements 54 and 56 lodged therebetween. In the illustrated embodiment the fastener 12 is free to rotate within assembly 10 as described above. In certain applications, however, the fastener may be fixed with respect to the retaining stemmed washer, such that only mating fastener 52 is rotated for securement.

As illustrated in FIG. 4, the final assembly presents an actual length or dimension 58 between the area of abutment 44 of the outer surface 36 and the abutment end 42 of the mating fastener 52. It should be noted that the final dimension 58 may provide for loose attachment of the elements to one another, or slight crushing or compression of one or both elements. The washer portion 22 serves as a spring washer to buffer the force applied to the fastened elements. In addition, the ability of the washer portion 22 to be elastically deformed over a range of angular movement enables the fastener 10 to accept for tolerances in the manufacturing process of the fastened member, or members, as well as the standoff portion 24. The arrangement is thus particularly well suited to fastening components that may be damaged or deformed, or otherwise vary from an intended or uniform thickness, such as plastics, rubbers, expanded metals, and so forth. The arrangement is also particularly well suited to fastening components for which dimensions should be maintained or over-pressure should be avoided, such as metal, glass, and other harder and dimensionally stable components. Consequently, the outer surface 36 may or may not be transverse to the standoff portion 24. Therefore, the final dimension 58 may or may not be equal to the maximum effective length of the standoff portion 24. However, in the illustrated embodiment the outer surface 36 is transverse to the standoff portion and the final dimension 58 is equal to the effective length 48 of the standoff portion. Furthermore, when the generally conical washer portion 22 is flattened, much, if not all, of the abutment surface 36 may be the area of abutment 44.

Figure 5:
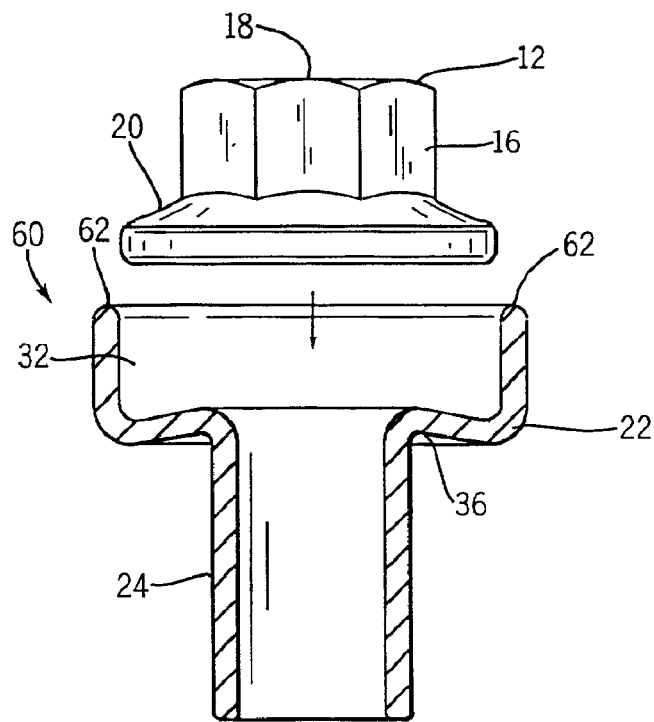
FIGS. 5 and 6 are sectional views of the assembly of FIGS. 1 and 2 showing steps in progressive manufacture of the assembly for retaining the threaded fastener within the stemmed washer.
Figure 6:
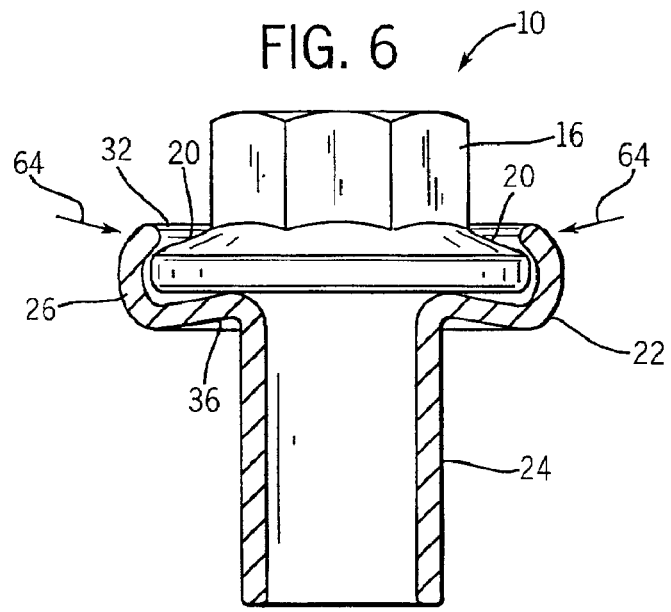

FIGS. 5 and 6 illustrate progressive manufacturing assembly of the elements described above. In a present embodiment, a drawing or stamping operation is used to form a blank 60. The integral washer portion 22 is presented to a generally upstanding open skirt 62 of blank 60. With the fastener 12 thus in place, the open skirt 62 of FIG. 5 is bent inwardly, such as in a crimping operation, as illustrated by arrows 64 in FIG. 6, to define the cavity 32. As noted above, while this operation may secure the fastener rigidly within the assembly to prevent rotation, in a presently preferred configuration, the fastener 12 may freely spin within the cavity 32 to allow securement to the mating fastener 52, while the stemmed washer remains stationary.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An internally threaded fastener assembly comprising:
    a stemmed washer having a spring washer portion, a standoff portion integral with the spring washer portion, and a retaining portion extending inward from an outer perimeter of the spring washer portion, wherein the spring washer portion is configured to deflect an axial distance between an at rest position and an operative position; and
    an internally threaded fastener having a peripheral flange, wherein the retaining portion of the stemmed washer extends over the peripheral flange to retain the fastener in the stemmed washer, wherein the spring washer portion and the retaining portion define a cavity for the peripheral flange, the cavity having an axial dimension that is greater than or equal to the thickness of the peripheral flange plus the axial distance.
2. The assembly of claim 1, wherein the spring washer portion is generally conical.
3. The assembly of claim 1, wherein the spring washer portion extends from the standoff portion at an angle, wherein the spring washer portion is elastically deformable relative to the standoff portion.
4. The assembly of claim 3, wherein the spring washer portion is biased to extend from the standoff portion at an acute angle.
5. The assembly of claim 1, wherein the fastener is rotatable with respect to the stemmed washer.
6. The assembly of claim 1, wherein the standoff portion forms a hollow right cylinder.
7. The assembly of claim 1, wherein the standoff portion has a variable effective length.
8. The assembly of claim 1, comprising an externally threaded fastener having a threaded shaft configured to extend through the standoff portion and to mate with the internally threaded fastener, wherein the externally threaded fastener includes a head configured to abut an end of the standoff portion at an outer end opposite from the washer.
9. An internally threaded fastener assembly comprising:
    a threaded nut having a peripheral extension; and
    a base, comprising:
        a washer portion;
        a standoff portion, wherein the washer portion extends outwardly from the standoff portion at an acute angle relative to the standoff portion; and
        a retaining portion extending inwardly from the washer portion to capture the peripheral extension of the threaded nut in a cavity between the retaining portion and the washer portion, wherein the cavity has an axial dimension greater than or equal to the thickness of the peripheral extension plus an axial distance spanned by the acute angle of the washer portion; and
    a threaded bolt mated to the threaded nut, wherein the shaft of the threaded bolt extends through the standoff portion and a head of the threaded bolt abuts an outer end of the standoff portion at an outer end opposite from the washer portion.
10. The assembly of claim 9, wherein the washer portion is generally conical.
11. The assembly of claim 10, wherein the washer portion is biased toward the first angle relative to the standoff portion.
12. The assembly of claim 9, wherein the washer portion is elastically deformable from a first angle relative to the standoff portion to a second angle relative to the standoff portion.
13. The assembly of claim 9, wherein the standoff portion, the washer portion and the retaining portion form a single-piece structure.
14. An internally threaded fastener assembly comprising:
    an internally threaded fastener; and
    a base, comprising:
        a standoff portion;
        a washer portion extending outward from the standoff portion at an angle, wherein the washer portion is elastically deformable to enable the angle of the washer portion to be varied an axial distance relative to the standoff portion; and
        a retaining portion extending inward from an outer perimeter of the washer portion to form a cavity between the washer portion and the retainer portion to retain the fastener and to enable the fastener to rotate relative to the base, wherein the cavity has an axial dimension greater than or equal to a retained portion of the fastener plus the axial distance.
15. The assembly of claim 14, wherein the washer portion is biased to a specific angle relative to the standoff portion.
16. The assembly of claim 15, wherein the specific angle defines a range of variation in the effective length of the standoff portion.
17. The assembly of claim 14, wherein the elastically deformable washer portion is generally conical.
18. The assembly of claim 14, wherein the elastically deformable washer portion extends at an acute angle relative to the standoff portion.
19. The assembly of claim 14, wherein the fastener is rotatable with respect to the base.
20. The assembly of claim 14, comprising an externally threaded fastener having a threaded shaft configured to extend through the standoff portion and to mate with the internally threaded fastener, wherein the externally threaded fastener includes a head configured to abut an end of the standoff portion at an outer end opposite from the washer portion.
21. A method for making a fastener assembly, the method comprising:
    providing an internally threaded fastener;
    forming a base with a standoff portion and a washer portion extending outward from the standoff portion at an acute angle;
    disposing the fastener on the washer portion; and
    plastically deforming the washer portion radially inward to form a skirt portion to retain the fastener in assembly with the base, wherein the washer portion and the skirt portion define a cavity having an axial dimension greater than or equal to a retained portion of the fastener plus an axial distance spanned by the acute angle of the washer portion.

22. The method of claim 21, wherein the retained portion includes a peripheral flange extending radially from the fastener, and wherein the skirt portion is deformed to capture the peripheral flange.

23. The method of claim 21, wherein the skirt portion is deformed with respect to the fastener to permit rotation of the fastener with respect to the base.

24. The method of claim 21, wherein the skirt portion is plastically deformed by a crimping operation.

25. The method of claim 21, wherein the standoff portion is formed to extend a predetermined length from the washer portion.

26. The method of claim 21, wherein the standoff portion forms a hollow right cylinder.

27. The method of claim 21, comprising providing an externally threaded fastener configured to extend through the standoff portion and mate with the internally threaded fastener, wherein the externally threaded fastener includes a head configured to abut an end of the standoff portion at an outer end opposite from the washer portion.

28. A fastened joint comprising:
a first member;
a second member;
a stemmed fastener, comprising:
  a stemmed washer having a standoff portion, a spring washer portion integral with the standoff portion, and a retaining portion forming a cavity with the spring washer portion, wherein the spring washer portion is configured to deflect an axial distance between an at rest position and an operative position;
an internally threaded fastener retained in assembly with the stemmed washer in the cavity between the retaining portion and the spring washer portion, wherein the cavity has an axial dimension greater than or equal to a retained portion of the internally threaded fastener plus the axial distance; and
an externally threaded fastener matingly engaged with the internally threaded fastener, the externally threaded fastener including a head;
wherein the standoff portion extends through the first and second members and the first and second members are fastened between the spring washer portion and the head of the externally threaded fastener, and
wherein the head abuts an outer end of the standoff portion at an outer end opposite from the spring washer portion, such that the standoff portion limits compression of the internally and externally threaded fasteners about the first and second members.

29. The fastened joint of claim 28, wherein the spring washer portion is generally conical.

30. The fastened joint of claim 28, wherein the spring washer portion extends from the standoff portion at an acute angle.

* * * * *